United States Patent [19]
Pfeiffer, Jr. et al.

[11] Patent Number: 5,655,962
[45] Date of Patent: Aug. 12, 1997

[54] CONTINUOUS SEAL VEHICULAR EXHAUST DISTRIBUTION SYSTEM FOR BUILDING

[75] Inventors: Edward A. Pfeiffer, Jr., Warminster; Paul Hamilton, Levittown, both of Pa.

[73] Assignee: Exhaust Track, Inc., Warminster, Pa.

[21] Appl. No.: 589,241

[22] Filed: Jan. 22, 1996

[51] Int. Cl.$^6$ .................................................. F23J 11/02
[52] U.S. Cl. ............................ 454/64; 104/52; 454/167
[58] Field of Search ........................... 454/64, 166, 167; 104/52

[56] References Cited

U.S. PATENT DOCUMENTS

| | | |
|---|---|---|
| 3,473,462 | 10/1969 | Imming . |
| 3,913,470 | 10/1975 | Cullen ............................ 454/64 |
| 4,102,254 | 7/1978 | Grant . |
| 4,233,889 | 11/1980 | Nederman . |
| 4,259,897 | 4/1981 | Nederman . |
| 4,312,645 | 1/1982 | Mavros et al. . |
| 4,335,574 | 6/1982 | Sato et al. . |
| 4,389,923 | 6/1983 | Ludscheidt . |
| 4,567,817 | 2/1986 | Fleischer et al. .................. 454/166 |
| 4,660,465 | 4/1987 | Jantzsch et al. . |
| 4,699,046 | 10/1987 | Bellieni . |
| 4,714,010 | 12/1987 | Smart ............................. 454/64 |
| 4,762,054 | 8/1988 | Melville et al. . |
| 4,796,520 | 1/1989 | Kramer, Jr. . |
| 5,092,228 | 3/1992 | Pfeiffer, Jr. et al. . |
| 5,362,273 | 11/1994 | Pfeiffer, Jr. et al. . |

FOREIGN PATENT DOCUMENTS

| | | | |
|---|---|---|---|
| 432318 | 6/1975 | U.S.S.R. ............................. | 454/64 |
| 19838 | of 1905 | United Kingdom .................... | 454/167 |
| 2172385 | 9/1986 | United Kingdom .................... | 454/167 |

OTHER PUBLICATIONS

Emergency Apparatus Diesel Control (Controlling Diesel Exhaust Fumes and Gases), Filter Clean Corporation, Three (3) pages.

Primary Examiner—Harold Joyce
Attorney, Agent, or Firm—Caesar, Rivise, Bernstein, Cohen & Pokotilow, Ltd.

[57] ABSTRACT

An exhaust fumes distribution system for use within a structure adjacent to a space in which a vehicle having an engine coupled to a vertically oriented, open ended, exhaust stack is to be located to discharge exhaust fumes out of the structure. The system comprises an blower, an elongated, hollow guide tube having a slot extending the length thereof. The guide tube includes a pair of sealing members located along the slot for forming a sealed interface through which the exhaust stack is arranged to enter, so that fumes from the stack are carried down the guide tube and vented out of the structure by the blower. The sealing members are of generally C-shape in cross section so that peripheral portions thereof abut along the length of the slot to form the sealed interface. The interface is arranged to open at any point along the length thereof for receipt of the open end of the exhaust stack of the vehicle, with the remaining portions of the interface remaining sealed so that the exhaust fumes cannot gain ingress into the interior of the structure through the interface.

15 Claims, 4 Drawing Sheets

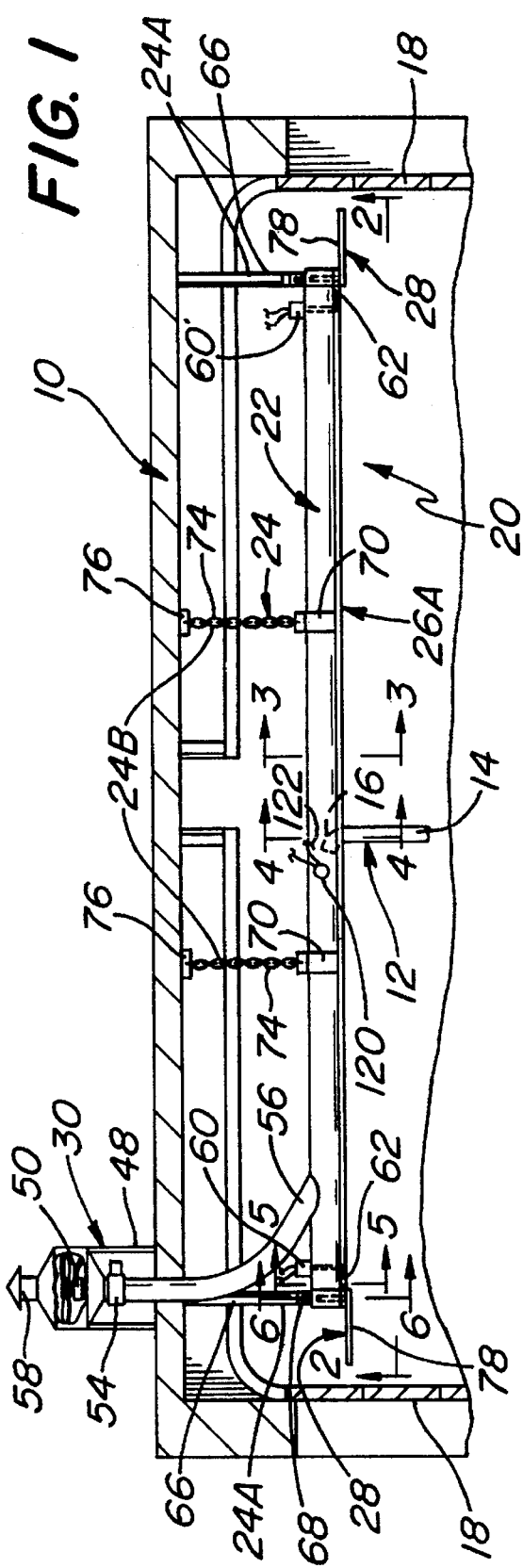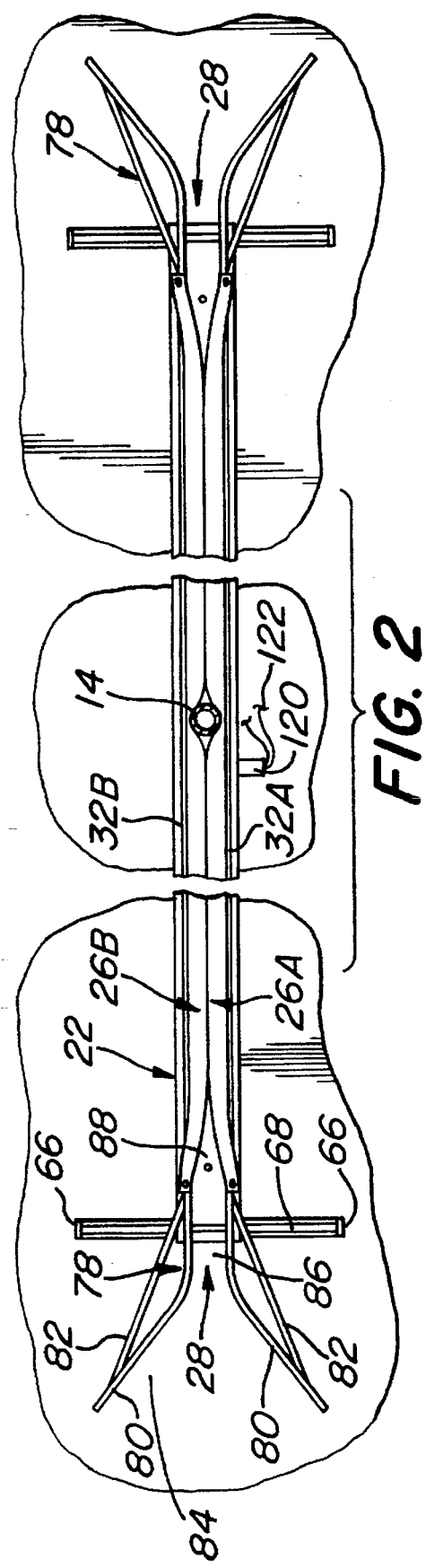

CONTINUOUS SEAL VEHICULAR EXHAUST DISTRIBUTION SYSTEM FOR BUILDING

BACKGROUND OF THE DISCLOSURE

This invention relates generally to exhaust distribution systems and more particularly to systems for exhausting fumes from motor vehicles having vertically oriented exhaust stacks when such vehicles are located within a building having the system in place.

The prior art includes many vehicle exhaust distribution systems for disposition in a building to vent exhaust fumes from automobiles, emergency vehicles, trucks and other vehicles while the vehicle is located therein. While these prior art systems may achieve their intended purpose of venting the exhaust fumes from the vehicle out of the building, they nevertheless suffer from one or more drawbacks. For example, many of these systems are quite complicated and involve many moving parts therefore making installation and maintenance very expensive. Further, many of these systems require manual connection and/or disconnection from the vehicle exhaust stack or tailpipe. Additionally, many of these systems require the placement of a special adaptor or cone over the open end of the vehicle exhaust stack in order to introduce the stack into the exhaust distribution system. Finally, many of these systems use seals, moldings or lips for containing exhaust fumes.

For example, U.S. Pat No. 3,473,462 (Imming) discloses an exhaust system wherein a flexible exhaust tube is telescoped when not in use within a rigid storage conduit suspended from the ceiling and communicating with an exhaust fan. The flexible exhaust tube is manually withdrawn from stored position by means of pulleys and cables. The outer end of the flexible exhaust tube is provided with an adaptor which is designed to be fitted over and connected to the end of the vehicle's exhaust pipe. Although the system provides a means for venting exhaust fumes from a tailpipe to the atmosphere outside the building, the above-mentioned drawbacks still appear to exist.

U.S. Pat. No. 4,102,254 (Grant) discloses an exhaust disposal system which includes conduit disposed in a trench below a garage floor which at one end has attached a flexible ribbed cup-like member which is designed to engage with the tailpipe of a vehicle. The conduit can be extended upwardly from the trench by means of a switch activated motor in a manner so that the flexible ribbed cup-like member can engage with the tailpipe of the vehicle and vent exhaust fumes to the outside atmosphere. Although this system provides a means for automatically engaging and disengaging the vehicle's tailpipe, several of the previously mentioned drawbacks still appear to exist. Specifically, this system requires the attachment of a special L-shaped tube to the tailpipe to facilitate engagement with the exhaust disposal system. Further, this system utilizes a moving conduit which is operated by motor consisting of several moving parts, such as a belt and gears.

U.S. Pat. No. 4,567,817 (Fleischer) discloses an exhaust-gas offtake track for exhausting fumes from a track-guided vehicle. The exhaust stack of the vehicle extends vertically into a collecting funnel. The funnel forms a portion of a trolley assembly to slide down the track and communicates with the interior of the track to carry fumes from the vehicle into the interior of the track for venting out of the building. This system also appears to have several drawbacks, namely, the necessity of attaching a collecting funnel to the top of a vertical exhaust stack prior to introducing the exhaust stack into the system, and the necessity to use sealing lips on the underside of the gas waste duct.

It is believed that Filterclean Corporation of Edison, N.J. offers an exhaust distribution system including a venting device for vehicles equipped with vertical exhaust stacks under the model designation VSR-20. It is believed that such a system is arranged for use with vehicles having a vertically extending exhaust pipe and includes a suction rail containing a slit on its bottom side to allow for the introduction of a vehicle's vertical exhaust stack into the exhaust disposal system.

This system is also believed to make use of two rubber sealing lips which run the length of the suction rail to prevent leakage of exhaust fumes to the interior of the structure. In addition, it is believed that the vehicle's vertical exhaust stack must be fitted with a special cone to allow smooth entry into the rubber seals underneath the suction rail.

Other devices which vent and/or trap exhaust fumes from a vehicle's exhaust stack or tailpipe are disclosed in U.S. Pat. Nos. 4,796,520 (Kramer), 4,660,465 (Jentzsch et. al.), 4,259,897 (Nederman), 4,233,889 (Nederman), 4,762,054 (Melville et. al), 4,699,046 (Bellieni) 4,389,923 (Ludscheidt), 4,312,645 (Mavros et al.) and 4,335,574 (Sato, et al.).

While the foregoing prior art systems may achieve their intended purpose, namely, venting the exhaust fumes from the vehicle out of the building, they nevertheless leave much to be desired from the various standpoints previously discussed.

In U.S. Pat. No. 5,092,228 (Pfeiffer et al.)-which is hereinafter referred to as the '228 patent and of which I am a coinventor—there is disclosed and claimed an exhaust distribution system which overcomes many of the drawbacks of the prior art systems. Specifically, the exhaust distribution system of the '228 patent is arranged for use within a structure, e.g., a firehouse, adjacent a space in which a vehicle, e.g., a fire truck, having a vertically oriented, open ended, exhaust stack is to be located. The system basically comprises elongated track mounted horizontally below the ceiling or roof of the structure, a trolley slidably mounted on the track and including an inlet adapted to receive the open upper end of the vertical exhaust stack, a biasing assembly to position the trolley, a blower for venting fumes from the structure, a flexible hose connecting the inlet of the trolley to the blower, and a blower actuating switch for turning the blower when the vehicle's engine is on. The track supports the trolley for slidable movement therealong from a first position adjacent an entrance to the structure to a second position within the structure remote from the entrance and where the vehicle will be parked. The biasing assembly is arranged for automatically positioning the trolley means at the first position so that when the vehicle is driven into the structure the stack is automatically received within the inlet of the trolley and remains in the inlet while the vehicle is within the structure. The blower actuating switch is arranged to sense a predetermined pressure in the stack, thereby indicating that the vehicle's engine is running and exhaust fumes are being produced, to cause the blower to turn on, whereupon the exhaust fumes are drawn through the hose means and the blower to be vented out of the structure.

One advantage the '228 system has over the prior art is that it is arranged to automatically attach and detach to the open end of the vehicle's stack to discharge any exhaust fumes out of the structure. Therefore, the system does not require manual connection and/or disconnection from the vehicle exhaust stack or tailpipe as is necessary in some prior art systems. Moreover, many of the prior art systems require the use of a special adaptor or cone which is mounted on the open end of the vehicle exhaust stack in order to introduce the stack into the system. In the system of the '228 patent no special adapters or cones are used on the exhaust stack itself. Instead, the open end of the vehicle's exhaust stack enters directly into the mouth of a hose assembly which is supported by a trolley. Further, the prior art systems make use of sealing lips to prevent leakage of exhaust fumes to the interior of the structure. The system of the '228 patent is constructed to enable the open end of the exhaust stack to be fully contained within the inlet end of the hose as the vehicle is moved within the building so that the trolley is moved down the track by the movement of the vehicle.

In U.S. Pat. No. 5,362,273 (Pfeiffer et al.)—which is hereinafter referred to as the '273 patent and of which I am a coinventor—there is disclosed and claimed an exhaust distribution system which overcomes other drawbacks of the prior art systems. Specifically, the exhaust distribution system of the '273 patent is arranged for use within a structure, e.g., a firehouse, adjacent a space in which a vehicle, e.g., a fire truck, having a vertically oriented, open ended, exhaust stack is to be located. The system basically comprises an actuatable blower or exhaust fan mounted adjacent the roof and venting to the ambient atmosphere, an elongated guide tube mounted horizontally below the ceiling or roof of the structure, a collapsible conduit mounted in the guide tube, and a wireless transmitter and receiver system for activating the blower. The guide tube has a hollow interior and a slot extending therealong. The guide tube with the slot therein extends over the space in which a vehicle is to be located, e.g., the vehicle's parking bay, so that it extends from an entrance to the building to a remote position within the building. The collapsible conduit is mounted within the guide tube and is coupled to the blower. The conduit has an open end or inlet and is biased into an extended position within the guide tube so that the inlet is located adjacent the first position to receive the open end of the exhaust stack through the guide tube slot. The conduit is collapsible so that the open end of the stack remains within the inlet opening in the conduit when the vehicle is moved within the building from the first position to the second position, e.g., its parking bay. The wireless transmitter is mounted within the vehicle and is coupled to a switch forming a portion of the vehicle's ignition system. The receiver is mounted within the building and is coupled to the exhaust blower, so that upon operation of the vehicle's ignition switch a signal is transmitted to the receiver, which in turn causes the blower to operate to vent fumes in the stack through the conduit and out of the building. The guide tube is mounted so that it can be shifted laterally to readily receive the vehicle's exhaust stack.

The system subject to the '273 patent also overcomes many of the disadvantages of the prior art systems. For example, like the system of the '228 patent the system of the '273 patent is arranged to automatically attach and detach to the open end of the vehicle's stack to discharge any exhaust fumes out of the structure. Therefore, the system does not require manual connection and/or disconnection from the vehicle exhaust stack or tailpipe as is necessary in some prior art systems. However, the system of the '273 patent does not make use of a trolley for receiving the open end of the exhaust stack, but rather uses a simply constructed, low mass collapsible conduit, thus resulting in a somewhat more simplified system. Moreover, the system of the '273 patent provides for automatic venting of the exhaust fumes from the vehicle whenever the vehicle is operated, e.g., ignition of the vehicle causes the blower of the system to operate via the transmitter/receiver system.

While the systems of the '228 and '273 system overcome many disadvantages of the prior art, they still leave something to be desired from the standpoint of simplicity of construction, and ease of use for drive-through or non-drive through applications.

Thus, a need arises for a system which overcomes the disadvantages of the '228 and '273 patents, yet offers numerous advantages.

OBJECTS OF THE INVENTION

It therefore is a general object of this invention to provide an exhaust fumes distribution system which overcomes the disadvantages of the prior art.

It is also an object of this invention to provide an exhaust fumes distribution system which is simple in construction.

It is another object of this invention to provide an exhaust fumes distribution system which is effective in operation.

It is another object of this invention to provide an exhaust fumes distribution system which enables one or more vehicles to be driven into a building through one entranceway, coupled to the system, and driven out of the building through another entranceway, with the vehicle being coupled to the system at all times to vent it fumes to the outside atmosphere.

SUMMARY OF THE INVENTION

These and other objects of this invention are achieved by providing an exhaust fumes distribution system for use within a structure, e.g., a building, adjacent a space in which a vehicle having an engine coupled to a vertically oriented, open ended, exhaust stack is to be located to automatically attach/detach to the open end of the stack to discharge exhaust fumes from the vehicle out of the structure.

The system basically comprises an elongated guide tube, first and second resilient sealing members, and venting means. The elongated guide tube has a hollow interior and a slot having first and second spaced apart marginal edges which extend longitudinally along the guide tube and in communication with the hollow interior thereof. The guide tube is arranged to be mounted horizontally above the space so that its slot extends from a first position adjacent a first entrance to the structure to a second position within the structure remote from the first entrance, e.g., adjacent a second entrance. The guide tube has an inner surface and an outer surface.

The first and second resilient sealing members are each an elongated member of generally C-shape cross section and having a pair of edges. One of the edges of the first sealing member is secured to the inner surface of the guide tube remote from the first marginal edge and the other of the edges of the first sealing member is secured to the guide tube immediately adjacent the first marginal edge. In a similar manner, one of the edges of the second sealing member is secured to the inner surface of the guide tube remote from the second marginal edge and the other of the edges of the second sealing member is secured to the guide tube immediately adjacent the second marginal edge, whereupon peripheral portions of the first and second sealing members abut each other along the length of the slot to form a sealed interface.

The sealed interface precludes exhaust fumes from flowing therethrough, yet is arranged to open at any point along the length thereof for receipt of the open end of the exhaust stack of the vehicle, with the remaining portions of the interface remaining sealed.

The venting means is coupled to the interior of the guide tube for venting fumes to the exterior of the structure, whereupon exhaust fumes from the open end of the stack are caused to flow down the interior of the guide tube for removal therefrom, with little or no exhaust gaining ingress to the ambient atmosphere within the structure through the interface even when the vehicle is moved in the structure from the first position to the second position or vice versa.

DESCRIPTION OF THE DRAWINGS

Other objects and many attendant features of this invention will become readily appreciated as the same becomes better understood by reference to the following detailed description when considered in connection with the accompanying drawing wherein:

FIG. 1 is a side elevation view, partially in section, showing the system of the present invention mounted within a building for venting exhaust fumes from a vehicle (a portion of which is shown in phantom lines) located therein;

FIG. 2 is a bottom plan view of a portion of the system taken along line 2—2 of FIG. 1;

DETAILED DESCRIPTION OF THE PREFERRED EMBODIMENTS

Figure 3:
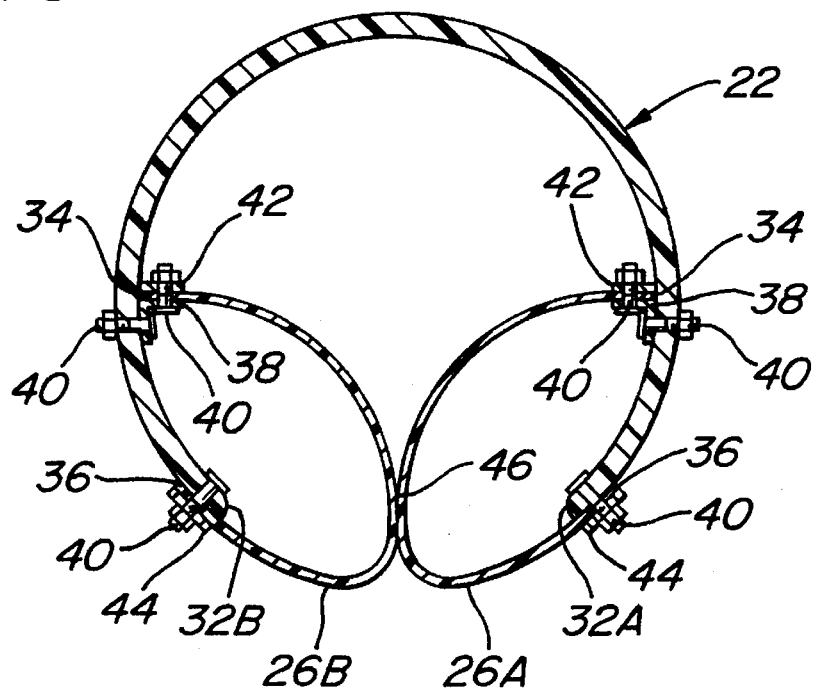
FIG. 3 is an enlarged, sectional view taken along line 3—3 of FIG. 1.

Referring now to various figures of the drawings where like reference numerals refer to like parts, there is shown at 20 in FIG. 1, a drive-through exhaust fumes distribution system constructed in accordance with this invention mounted within a conventional building 10, e.g., a fire "house" or station. In the embodiment shown herein the station includes a pair of entrance doors 18, one at each end of the building, and through which the vehicle(s) to be connected to the system 20 is(are) driven from either direction.

The details of the system 20 will be described later. Suffice it for now to state that the exhaust distribution system 20 is arranged to be mounted in the building 10 or any other structure in which a fire truck 12 or any other vehicle having a petroleum, e.g., gasoline or diesel, burning engine (not shown) and a vertically oriented exhaust stack 14 coupled thereto is to be located, e.g., parked, and operated. Thus, the system 20 is mounted, e.g., supported by an assembly to be described later, within the building 10 above the parking space or "bay" for the vehicle. In fact, the embodiment of the system 20 shown herein is arranged to accommodate at least two vehicles, e.g., fire trucks. Moreover, those vehicles can be brought into the building to their parking spaces from opposite directions through the doors 18, with the system 20 of this invention venting the fumes from those vehicles as soon as their exhaust stack engages the system and irrespective of the direction the vehicles are brought into the building or their position within the building along the system. In this regard, the system 20 is arranged to automatically receive the exhaust stack of any vehicle brought into its designated parking area in the building to vent any exhaust fumes produced by the vehicle's engine out of the building. To achieve that end, the system 20 includes means which automatically receives each vehicle's exhaust system stack whenever the vehicle is moved into the building to a first position adjacent the building's entrance or door and to remain coupled thereto when the vehicle is moved further back into the building to its normal parking location or bay and to remain coupled thereto when the vehicle is moved from the bay until the vehicle is out of the structure. Moreover, the system includes means which senses when the vehicle's ignition system has been activated to cause the system to operate to vent the vehicle's exhaust fumes out of the building to the ambient surroundings.

Figure 4:
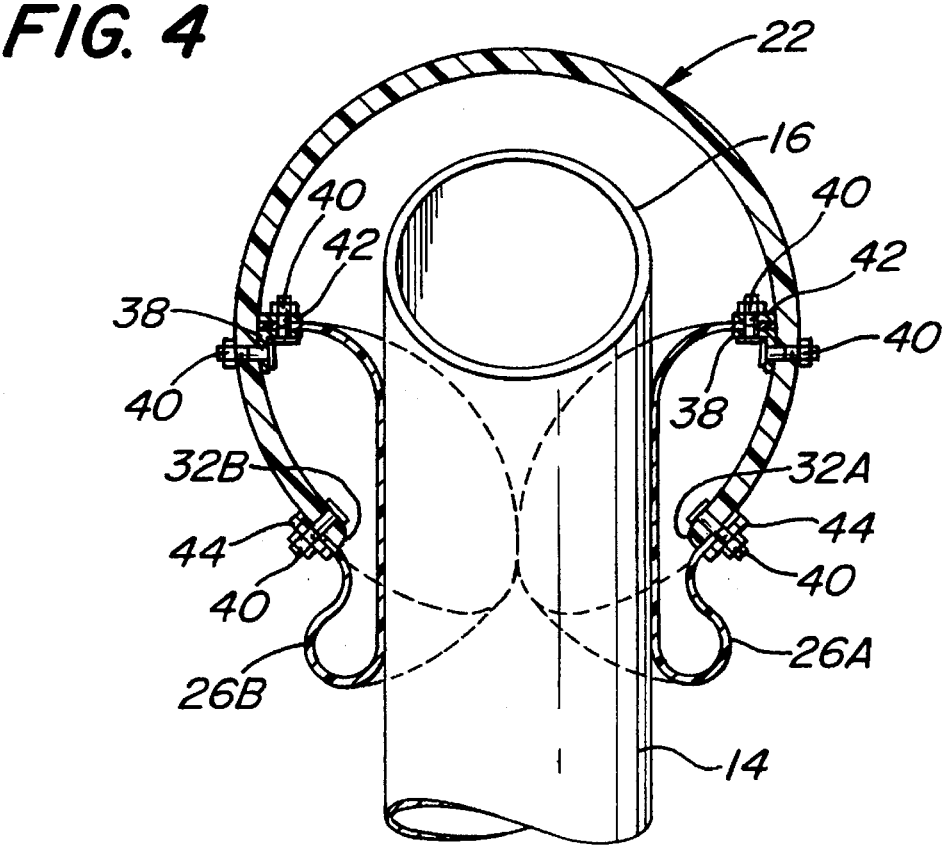
FIG. 4 is an enlarged, sectional view taken along line 4—4 of FIG. 1.
Figure 5:
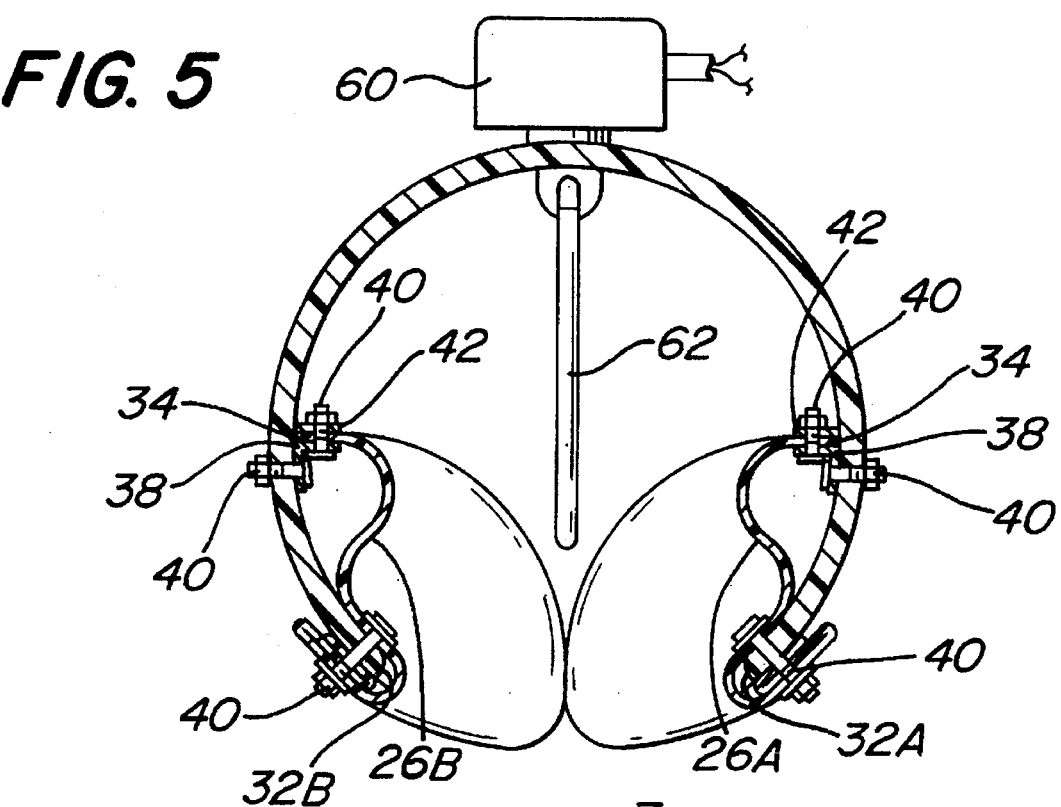
FIG. 5 is an enlarged, sectional view taken along line 5—5 of FIG. 1.

In the embodiment of the system shown herein, only a single vehicle 12, e.g., fire truck, is shown. However, it is to be understood that plural vehicles can be used with the system 20. As mentioned earlier the vehicle 12 includes a vertically disposed exhaust stack 14. As can be seen in FIGS. 1 and 4 the exhaust stack has an upper end which curves to a generally horizontal orientation and terminates in an open end 16.

As is conventional, the vehicle includes an ignition system having at least one actuating button, which when actuated causes the vehicle's engine to commence operation. It should be pointed out at this juncture that the specific vehicle shown herein is merely exemplary of any type of vehicle having a vertically oriented exhaust stack for which the subject invention has utility. Moreover, it is to be understood that the subject invention can be used in any type of structure to vent exhaust fumes from any such vertical-exhaust-stacked vehicle disposed therein. Thus, the system can be used in a building having entrance doors at each end of the building, whereupon one or more vehicles can be brought into the building and for coupling to the system 20 from either door (as is shown in FIG. 1), i.e., a "drive-through" system, or can be used in a building having only a single entrance door (not shown), i.e., a "non-drive through" system.

As can be seen in FIG. 1, the system 20 basically comprises an elongated guide tube 22 and associated mounting means 24, a pair of sealing lip members 26A and 26B, a pair of entrance assemblies 28, and an actuable fumes venting assembly 30. The details of the guide tube 22 will be described later. Suffice it for now to state that the guide tube 22 is an elongated tubular member formed of a rigid material, e.g., plastic or metal, and having a slot 32 (FIGS. 2–5) defined by a pair of parallel spaced marginal edges 32A and 32B extending longitudinally along the entire length of the guide tube.

The guide tube 22 is arranged to be mounted horizontally above the space(s) or bay(s) for the vehicle(s) 12 so that the slot 32 extends along the space(s)/bay(s) from a first position adjacent one entrance door 18 to a second position within the structure adjacent the other entrance door 18. It should be pointed out at this juncture that for buildings having only a single entrance door 18 the guide tube is arranged to be mounted horizontally above the space(s)/bay(s) for the vehicle(s) 12 so that the slot extends from a first position adjacent the single entrance door to a second position within the structure remote from that door.

Figure 7:
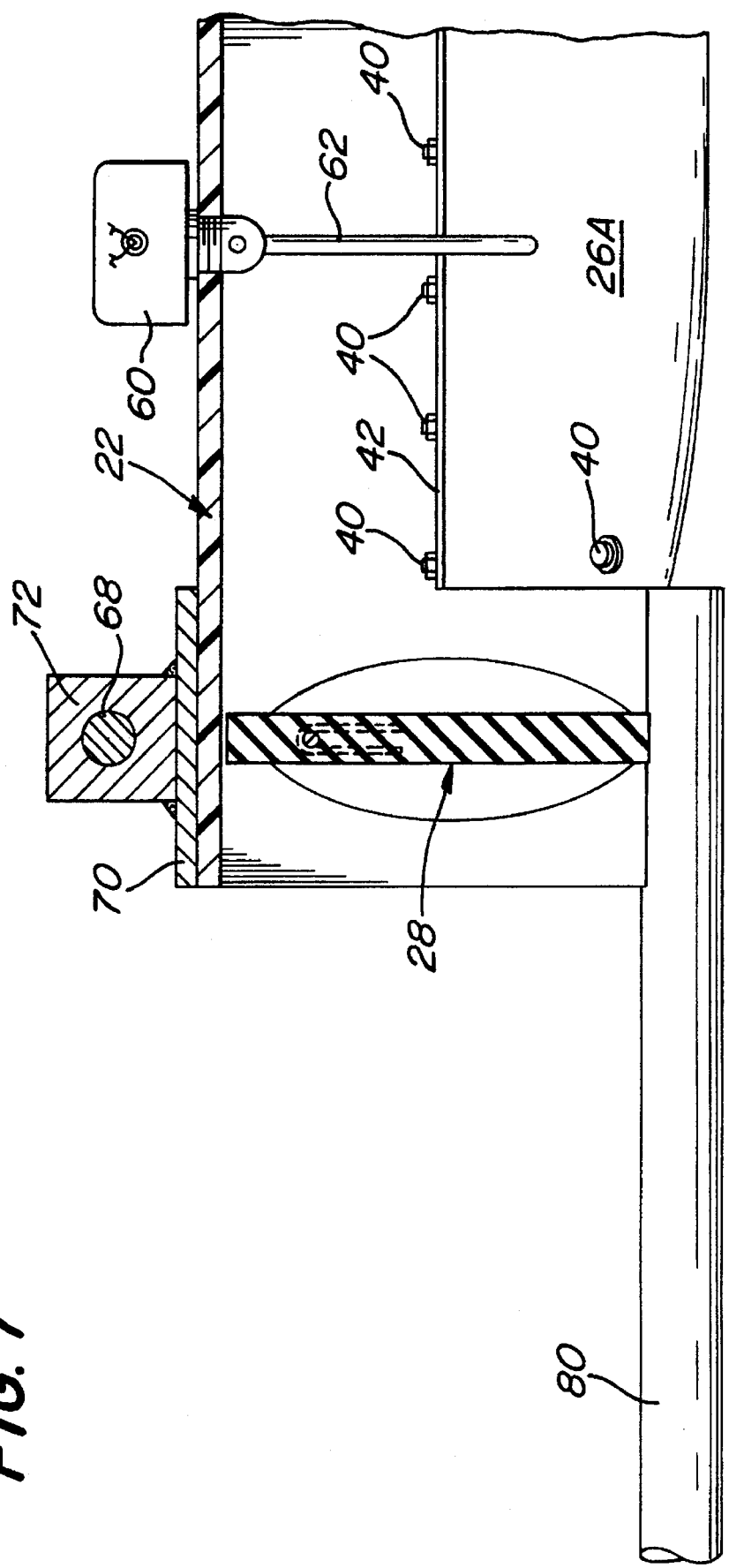
FIG. 7 is an enlarged, sectional view taken along line 7—7 of FIG. 6.

Each of the sealing lip members 26A and 26B is an elongated, resilient material, e.g., rubber, member, which is bent into a generally C-shaped cross section (see FIG. 3). Each sealing member extends along virtually the entire length of the guide tube, except for short portions of the guide tube contiguous with each end, as shown in FIG. 7, in order to accommodate gate portions of the entrance assemblies (to be described later). Each lip member includes a pair of edges 34 and 36. One of the edges, namely edge 34, of the sealing lip member 26A is secured to the inner surface of the guide tube 22 remote from the slot's marginal edge 32A along its entire length, whereas the other of its edges, 36, is secured to the outer surface of the guide tube 22 along virtually its entire length except for short portions contiguous with each end (for reasons to be described later). The means for securing the edge 34 to the guide tube 22 comprises plural brackets 38, associated pairs of bolts and nuts 40, and an elongated aluminum mounting strip 42. Alternatively, a self-threading screw could be used in lieu of a bolt and nut.

The brackets 38 are secured at spaced apart locations along the length the guide tube by respective combinations of bolts and nuts 40 which extend through longitudinally spaced apart holes in the guide tube. Each bracket includes a flange having an opening therein for supporting the marginal edge 34 of the sealing lip member 26A thereon. The elongated mounting strip 42 has holes along the length thereof and which are spaced apart by the same spacing as between the holes in the respective flanges of the brackets 38. The marginal edge 34 of the sealing lip 26A has holes along its length which are spaced apart by the same spacing as that between the holes in the respective flanges of the brackets 38. The mounting strip is disposed on top of the marginal edge 34 of the sealing lip 26A so that the holes in the strip are aligned with the holes in the flanges and with the holes in the marginal edge 34 of the sealing lip, and are bolted in place by respective bolts and nuts 40.

The other marginal edge 36 of the sealing lip member 26A is secured to the outer surface of the guide tube contiguous with the marginal edge 32A of the slot 32, via an elongated aluminum mounting strip 44 which is similar to strip 42, and by plural bolts and nuts 40. To that end, plural holes are provided at longitudinally spaced apart positions in the guide tube immediately adjacent its slot edge 32A. The mounting strip 44 includes plural holes along its length which are spaced apart by the same spacing as between the holes in the guide tube. The marginal edge 36 of the sealing lip 26A has holes along its length which are spaced apart by the same spacing as between the holes in the guide tube. The marginal edge 36 is bent around the slot edge 32A of the guide tube so that edge 36 is disposed on the outer surface the guide tube contiguous with the slot edge 32A, and with the holes aligned. The mounting strip 44 is disposed on top of the marginal edge 36 of the sealing lip 26A so that the holes in the strip are aligned with the holes in the marginal edge 36 of the sealing lip and with the holes in the guide tube and are bolted in place by respective bolts and nuts 40.

When the two edges 34 and 36 of the sealing lip member 26A are bent and secured in place as just described the sealing lip member forms a generally C-shaped profile or cross section, except for the portions located at the ends thereof. The shape of those ends of the sealing lip member 26A will be described later.

The marginal edge 34 of the sealing lip member 26B is secured to the inner surface of the guide tube 22 opposite from the location of the marginal edge 34 of the sealing lip member 26A in the same manner as described above with respect to sealing lip member 26A. Similarly the marginal edge 36 of the sealing lip member 26B is secured to the outer surface of the guide tube contiguous with slot edge 32B in the same manner as described above with respect to the sealing lip member 26A. Thus, when the two edges 34 and 36 of the sealing lip member 26B are bent and secured in place as just described the sealing lip member forms a generally C-shaped profile or cross section which is identical to that of sealing lip member 26A, except for being a mirror image thereof.

The two C-shaped sealing lip members 26A and 26B are sized so that respective longitudinally extending portions of their outside surfaces abut each other to form a longitudinally extending linear interface 46. The abutment of the sealing lip members at their interface 46 is sufficiently tight (although openable, as will be described later) so that, when closed, the interface precludes any exhaust fumes within the guide tube 22 from exiting therethrough. Since the material forming the sealing lips is resilient, e.g., rubber, the interface 46 is arranged to flex or bend open at any point along its length to accommodate the open upper end of the exhaust stack 14 of the vehicle, with the remaining portions of the interface remaining closed, i.e., the two sealing lips abutting, as shown clearly in FIGS. 2 and 4. In particular, as the vehicle moves through the building either to or from its parking spot or bay, its stack can freely slide down the guide tube slot 32 between the sealing lip 26A and 26B. The portions of the interface between sealing lips at which the stack is located at any particular moment open around the exhaust stack to accommodate the stack, while portions of the interface in front of and behind the stack are closed, as the stack slides along the guide tube. This action maintains a seal against egress of fumes from the stack into the building.

The introduction of the upper end of the exhaust stack 14 into the guide tube between the abutting sealing lips is accomplished at either end of the guide tube, e.g., via the entrance assembly located thereat, as will be described later.

The venting assembly 30 is coupled to the interior of the guide tube 22 for venting fumes introduced therein by the exhaust stack to the exterior of the structure 10. In particular, any exhaust fumes from the open end of the stack(s) are caused to flow down the interior of the guide tube for removal therefrom, with little or no exhaust fumes gaining ingress to the ambient atmosphere within the structure through the interface 46 even when the vehicle(s) is(are) moved in the structure along the guide tube.

As can be seen clearly on FIG. 1 the venting assembly 30 basically comprises a housing 48 mounted on the building's roof (or ceiling), an electrically operated exhaust fan 50, a control signal receiver (not shown), a control signal transmitter (not shown), a vehicle-position-sensing subsystem 52, a solenoid operated damper assembly 54, and a connector conduit 56. In lieu of a solenoid operated damper assembly, a spring-loaded damper assembly (not shown) can be utilized. The housing 48 houses the exhaust fan 50 and also includes an outlet or chimney 58 at the top end thereof and through which the exhaust fumes gain egress to the ambient atmosphere. The connector conduit 56 comprises a pipe or tube connected between the guide tube 22 adjacent one end thereof, and the damper assembly 54. The connector conduit 56 is in communication with the interior of the guide tube 22. The exhaust fan 50 is arranged when operated (activated) to draw the fumes from the interior of the guide tube through the conduit 56 to vent them through the chimney 58 to the ambient atmosphere.

The electrically operated exhaust fan 50 is activated in one of two ways and using means similar to that disclosed in the '273 patent, whose disclosure is incorporated by reference herein. To that end, upon start-up of the vehicle's engine, with vehicle 12 located within a parking bay in the building 10, the exhaust fan 50 is arranged to be activated immediately. This is desirable because at start-up, while the vehicle's engine is cold, rewing is necessary to warm it up and to build up air pressure for the brakes. Such engine revving produces a large amount of exhaust fumes which, if not evacuated immediately, will escape into the building. The quick activation of exhaust fan is accomplished through the use of the control signal transmitter and the control signal receiver, each of which is constructed in accordance with the teachings of the '273 patent. The transmitter is located within the vehicle coupled to the switch of the vehicle's ignition system or to the master switch which provides electrical power to the vehicle and produces and transmits an electrical control signal when either the master switch or the ignition switch is activated. The control signal receiver is preferably mounted on (or in) the vent assembly housing 48 and is arranged to receive the transmitted signal from the transmitter, but can be located at any convenient position in the building 10 so long as it is coupled to the fan. The transmitter transmits or broadcasts a low power electrical control signal via an associated antenna to the receiver when the vehicle's master switch or starter button(s) is(are) momentarily pressed in order to start the vehicle's engine. The receiver includes an antenna which is arranged to sense the broadcast low power electrical control signal from transmitter and to activate exhaust fan 50 in response thereto. This causes the exhaust fan to start rotating, whereupon the fumes are vented to the ambient atmosphere. A timer (not shown) is provided to automatically turn the exhaust fan off a predetermined period of time, e.g., a few minutes, after activation by the control signal transmitter/receiver combination.

Immediate activation of the exhaust fan is not as critical when the vehicle enters the building from outside because the vehicle's engine is idling and emitting much less smoke than on start-up. However, it is never the less desirable. Thus, in this case the exhaust fan is activated by the heretofore mentioned vehicle-position-sensing subsystem 52. The vehicle-position-sensing subsystem 52 basically comprises a pair of microswitches 60, one located at each end of the guide tube. Each microswitch is arranged to be engaged ("tripped") by the exhaust stack when the vehicle is driven into the building from either end thereof. The microswitches 60 are connected to the exhaust fan 50, to activate the fan when either microswitch is tripped by its being contacted by a vehicle's exhaust stack. To that end each switch includes a pivotable trip arm 62 (FIGS. 6 and 7) extending into the interior of the guide tube to be displaced upon being contacted by the upper end of the exhaust stack. Thus, when the arm 62 of each switch 60 is tripped, this causes the fan to be energized, that is, start rotating to thereby vent the fumes to the ambient atmosphere outside the building. Each switch 60 also includes a timer (not shown) so that it is also arranged to disable the fan, that is, turn the fan off, a predetermined time period, e.g., a few minutes, after the fan is turned on by the switch. A manual switch, not shown, coupled to the exhaust fan is also provided as part of the system 20 to turn the exhaust fan on and off. The manual switch does not include any timer. Thus, the manual switch when turned on will keep the fan on for as long as the switch is in the on position. This arrangement is necessary in order to perform maintenance on the vehicle requiring the engine to run for an extended period of time.

It should be noted that a pressure sensing subsystem (not shown) to sense any increased pressure within the guide tube, i.e., increased pressure caused by exhaust fumes introduced into the guide tube by the stack, can be used in addition to or in lieu of the microswitches 60 for some potential applications, if desired. That pressure sensing subsystem is similar to that disclosed in the '228 patent, whose disclosure is also incorporated by reference herein. Thus, the pressure sensing subsystem basically comprises at least one conventional, pressure responsive, electrically operated sensor switch. The switch is mounted to communicate with the interior of the guide tube at a location which is immediately adjacent the portion of the guide tube at which the exhaust stack of the vehicle will be disposed when the vehicle is parked in its bay, or at any other suitable location.

The solenoid operated damper assembly 54 is like that of the '228 patent and is mounted between the connector conduit 56 and the exhaust fan 50. This assembly is normally closed to isolate the interior of the guide tube (and hence the interior of the building) from the ambient surroundings. This insures that heat from the building does not escape through the vent to the ambient atmosphere outside the building, while also preventing pressure blow-back from the ambient atmosphere from falsely activating the system, that is, causing the pressure sensor(s) to initiate the operation of the fan. The solenoid operated damper assembly is arranged to open whenever the fan is operated.

The guide tube 22 is mounted in the building by suspending it from the building's ceiling by the heretofore identified mounting means 29. That means basically comprises a pair of end support subassemblies 24A and a pair of intermediate support subassemblies 24B. The details of those support assemblies will be described later. Suffice it for now to state that the support subassemblies 24A and 24B suspend the guide tube horizontally from the ceiling of the building, while enabling it to be shifted laterally, i.e., perpendicularly to its longitudinal axis, to readily accommodate the vehicle's exhaust stack therein. In order to facilitate the disposition of the exhaust stack into the guide tube as the vehicle 12 enters the building for location in its parking bay, a reference line (not shown) is provided, e.g., painted, on the floor of the building alongside the bay. The line is straight and runs from a point near one entrance door along the floor to a point near the other entrance door. By aligning the vehicle's tires with respect to the guide line as the vehicle enters the building, the vehicle will be oriented parallel to the guide tube. Preferably the vehicle will be precisely aligned with the guide tube so that the vehicle's stack may enter the guide tube without the guide tube having to shift laterally. However, even if the vehicle is not precisely aligned with the guide tube, the fact that the guide tube can be shifted laterally (as will be described later) ensures proper entrance of the exhaust stack into the guide tube. In addition, as will be described later, the entrance assemblies each include guiding means for guiding the exhaust stack into the guide tube.

The two end support subassemblies 24A are identical in construction to each other. Thus, only the one located at the end of the guide tube shown to the left in FIG. 1 will be described in detail. That subassembly includes a pair of vertical oriented support arms 66 (FIGS. 1 and 2) fixedly secured to the ceiling of the building and extending downward on either side of the guide tube. A horizontal shaft or rod 68 (FIG. 2) extends between the lower ends of the support arms 66 so as to be oriented perpendicular to the longitudinal axis of the guide tube. An open bracket ring 70 (FIG. 6) is suspended via bracket 72 fixedly secured thereto, e.g., welded, from the horizontal shaft 68 and is slidable therealong. The open bracket ring 70 is arranged to receive therein the open end of the guide tube and extends around in an arc greater than 180 degrees to hold the guide tube in place. Accordingly, the open bracket ring 70 supports the guide tube for sliding movement along the axis of the shaft 68, i.e., movement perpendicular or transverse to the longitudinal axis of the guide tube.

The intermediate support assemblies are of identical construction to each other. In particular, each basically comprise a chain 74 having an open bracket ring 70 fixedly secured to the lower end thereof, and a slide member (not shown) fixedly secured to the top end thereof. Each slide member is arranged to slide within an associated channel member 76 which is fixedly secured to the ceiling of the building 10. Each channel member is an elongated member which is also oriented perpendicular to the longitudinal axis of the guide tube. The open bracket ring 70 is arranged to receive an intermediate portion of the guide tube 22 and extends around that portion in an arc greater than 180 degrees to hold the guide tube inplace. Accordingly, the open bracket ring 70 suspended from the chain 74 supports the guide tube for sliding movement along the axis of the channel member 76, i.e., movement perpendicular or transverse to the longitudinal axis of the guide tube.

Since the guide tube is suspended from means which enables it to be slid laterally from side to side with respect to the guide line by the vehicle's stack, the stack remains in the guide tube even if the vehicle is driven slightly off course when being brought into its parking bay or out of it. It should be pointed out at this juncture that alternative means can be used to mount the guide tube for lateral sliding or displacement, such as the track and bearing slides disclosed in the '273 patent.

Figure 6:
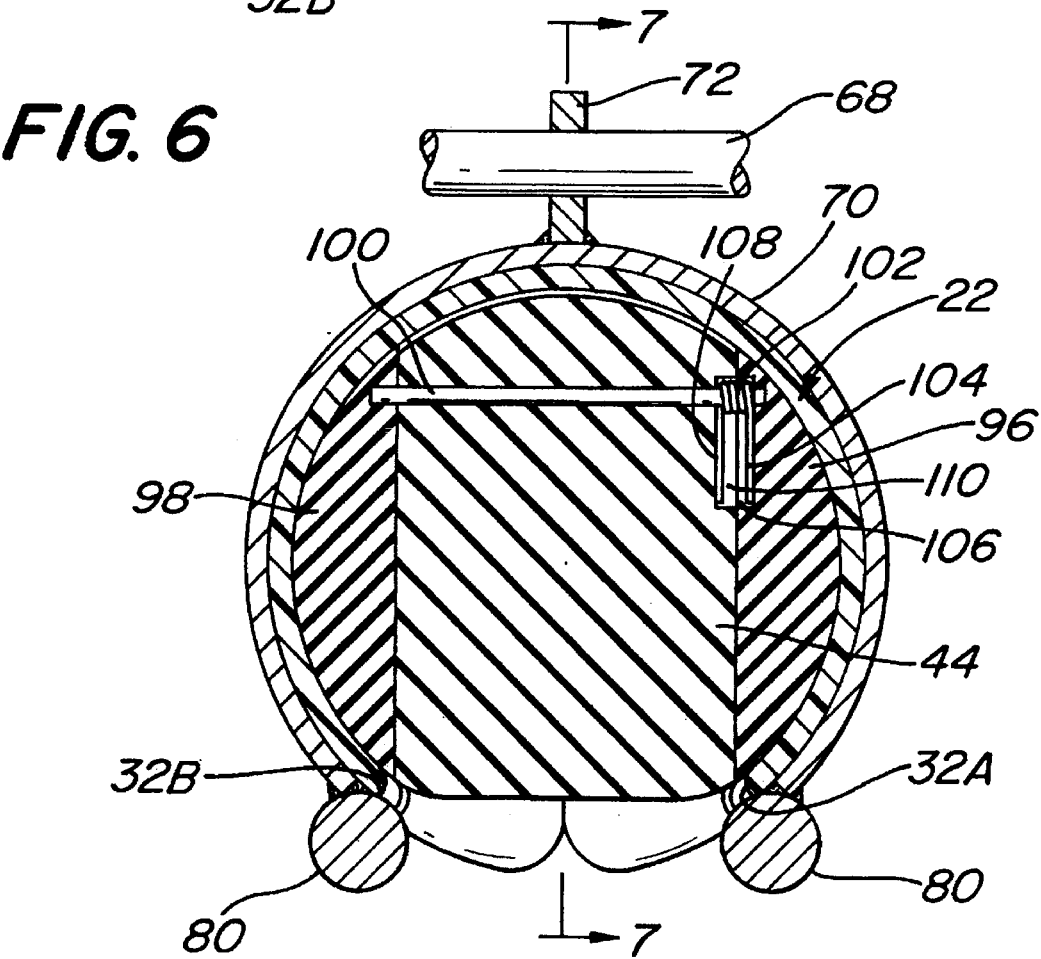
FIG. 6 is an enlarged, sectional view taken along line 6—6 of FIG. 1.

To facilitate the introduction or entrance of the exhaust stack into the guide tube, each entrance assembly 28 includes a stack entrance guide member 78. In the interest of brevity only the stack entrance guide member 78 that is located at the end of the guide tube shown to the left in FIG. 1 will be described in detail hereinafter, it being understood that the stack entrance guide member at the other end of the guide tube is of identical construction. Thus, as best seen in FIGS. 2, 6, and 7, the guide member 78 basically comprises a pair of angled rods members 80 and a pair of brace members 82. The guide member 78 is fixedly secured, e.g., welded, to the open bracket ring 70 of the end support subassembly 24A. The open bracket ring 70, the angled rod members 80, and the brace members 82 are all formed of any suitable heat resistant material, e.g., steel. The two rod members 80 are fixedly secured to the open bracket ring in such a manner that they form therebetween a V-shaped channel portion 84 (FIG. 2) leading to a linear channel portion 86. The linear channel portion 86 communicates and is aligned with the slot 32 at open end of the guide member 22. The brace members 82 are welded between the angled portions of the rod members 80 to give them added rigidity.

The V-shaped channel 84 and the communicating linear channel portion 86 serve to receive the upper portions of the stack 14 when the vehicle is brought into the building and to guide the stack into the guide tube slot 32 and between the sealing lips 26A and 26B. In particular, the V-shaped portion of the channel first receives the upper end of the stack, even if the stack is not axially aligned with the slot in the guide tube when the vehicle is moved into the bay. The continued movement of the vehicle further into the bay causes the engaged stack portion to slide first along the angled portion of guide rods. This action has the effect of causing the guide tube 22 to shift laterally to align the guide tube 22 with the exhaust stack. The continued movement of vehicle 12 into the bay then causes the engaged stack to move into and along the straight portion of angled rod members, i.e., the portions forming the linear channel, toward the open end of the slot 32. This action has the effect of automatically shifting and orienting the open front end of guide tube 22 with respect to the open end 16 of the stack 14.

In order to facilitate the entrance of the upper end of the exhaust stack into the interface 46 between the sealing lip members, the end portion of those members, i.e., the portions at each end of the guide tube, are gathered up (folded) and secured in such a manner to form an open generally V-shaped entranceway 88. This entranceway is best seen in FIG. 2 and is in communication with the linear channel 80 of the stack guide subassembly and with the open end of the guide tube's slot 32. That entranceway is formed by the end portions of the sealing lip members 26A and 26B contiguous with their respective marginal edges 36 being folded up and secured to both the inside and outside surfaces of the guide tube contiguous with respective edges of the guide tube slot 32. In particular, the portion of the sealing lip member 26A marginal edge 36 is folded over itself and disposed on the outside of the guide tube contiguous with the slot edge 32A. An intermediate portion of the sealing lip member 26A, i.e., a portion located between edge 36 and edge 34, is disposed against the inside surface of the guide tube directly opposite the folded portion on the outside of the guide tube. A bolt and nut combination 40 serves to hold the portions in place against the inside and outside surfaces of the guide tube, thereby drawing the end of the sealing lip 26A away from blocking the entrance to the guide tube slot 32. To prevent the mounting strip 44 from interfering with the folded (gathered) portions of the sealing lip member 26A as just described, the strip 44 terminates a short distance, e.g., 3 inches (7.62 cm) from each end of the sealing lip member 26A. Thus, each end of the sealing lip member 26A is folded over itself and secured via bolt/nut 40 to the outside of the guide tube 22 contiguous with the slot edge 32A, without any interference by the strip 44. The ends of the sealing lip member 26B are folded back and secured in the identical manner.

In order to close each end of the guide tube to preclude any exhaust fumes from exiting therefrom the entrance assemblies 28 at each end of the guide tube include a respective gate subassembly 90. In the interests of brevity only the gate subassembly 90 of the entrance assembly 28 at the left end of the guide tube 22 shown in FIG. 1 will be described in detail, it being understood that the other gate assembly is of identical construction. Thus, as can be seen in FIGS. 6 and 7 the gate subassembly 90 basically comprises a mounting frame 92 and a pivotable gate 94. The frame is formed of any suitable substantially rigid material, e.g., hard rubber, and includes a pair of generally planar side sections 96 and 98. Each of the side sections 96 and 98 includes an arcuate edge fixedly secured to a respective portion of the inner surface of the guide tube closely adjacent the open end of the guide tube. The gate 94 is a generally planar member which is disposed between the frame sections 96 and 98. The gate is also formed of any suitable substantially rigid material, e.g., hard rubber, and has an arcuate top edge and an generally linear bottom edge. The top edge of the gate is disposed immediately adjacent the inner surface of the guide tube between the frame sections 96 and 98. The gate is mounted for pivoting about the axis of a rod 100. The rod is mounted to extend between the frame sections 96 and 98 so that its axis is perpendicular to the longitudinal axis of the guide tube. A biasing spring 102 is disposed on one end of the rod 100. The spring 102 includes one end 104 received within a slot 106 in the frame section 96 and another end 108 received within a slot 110 in the gate 94. The spring biases the gate 94 to the neutral or closed position shown in FIGS. 6 and 7, whereupon the end of the guide tube is closed. Since the gate is pivotable about the axis of the rod 100, upon the introduction of the top end of the vehicle's exhaust stack into and through the channel 86, as described above, the exhaust stack will engage the gate to cause it to swing upward (inward) into the guide tube, thereby enabling the stack to pass thereby. As soon as the upper end of the stack clears the gate, the gate pivots back downward under the bias of the spring 102 to the closed position shown in FIGS. 6 and 7, thereby re-closing the end of the guide tube.

It should be pointed out at this juncture that the system 20 as shown herein enables a vehicle to be driven into the building from one door, and driven out through the opposite door, all the while receiving the vehicle's exhaust stack therein to vent the fumes to the ambient atmosphere outside the building. Thus, the system 20 can be deemed to be a "drive through" system. For drive through applications in which the vehicle can be brought into the building from either direction, the gate must be arranged to be capable of swinging in both directions, i.e., into and out of the guide tube. For drive through applications wherein the vehicle will always be brought in one door and brought out the other door, the gate need only be able to swing in the direction that the vehicle will move.

The system 20 can also be arranged so that one end of the guide tube is permanently closed (e.g., a non-drive through arrangement). In that arrangement the vehicle will have to be driven in and backed out or backed in an driven out from one end. That end can be open and need not include any gate mechanism. Moreover, in such non-drive through systems, only a single microswitch 60 need be utilized to cause the exhaust fan to operate when the vehicle is brought into the building. A manual switch, like that described heretofore, is utilized to run the exhaust fan when vehicle maintenance is to be accomplished. In the interests of keeping costs to a minimum, a non-drive through system may utilize a pressure sensing subsystem to turn on the exhaust fan whenever increased pressure is sensed in the guide tube (thereby indicating that the vehicle's engine is running), in lieu of the receiver/transmitter system described above. It should, of course, be understood that the receiver/transmitter system can be used in a non-drive through system as well as in a drive through system.

If desired the system may include one or more sensors or detectors for detecting the presence of exhaust within the guide tube and for controlling the operation of the system in response thereto in lieu of the detection means, e.g., switches 60, described heretofore, or in addition to such means. The exhaust fumes detecting device can be of any suitable type and can be mounted at any desired position on the guide tube, depending upon the function to be achieved. For example, if sensing of start-up or ignition of a parked vehicle is desired, so that the fan can be operated in response thereto, the exhaust fumes detector is preferably mounted so that it is located on the guide tube at a position immediately adjacent the point at which the open upper end 16 of the stack will be located when the vehicle is parked in its normal parking bay within the building. This mounting arrangement is shown clearly in FIGS. 1 and 2 and ensures maximum sensitivity for parked engine start-up detection.

If vehicle entry sensing is desired, e.g., the sensing of the vehicle being driven into the building, the detector 120 is preferably mounted so that it is located on the guide tube at a position immediately adjacent the end of the guide tube at which the vehicle's exhaust stack will first enter. In a bi-directional drive-through system a pair of detectors 120 are used, one at each end of the guide tube. If detection of both vehicle entry and vehicle start-up are desired then the system 20 may include multiple detectors 120, one at each end of the guide tube into which the vehicle's exhaust stack will be received, and one at each intermediate location on the guide tube at which the exhaust stack(s) of the vehicle(s) will be located when the vehicle(s) is parked in its(their) bay(s).

One particularly desirable type of exhaust detector is a conventional infrared photoelectric detector 120. Such a device includes transmitter means (not shown), reflection means (not shown), and receiver means (not shown). The transmitter means produces an IR output beam and directs it through smoke, air or any other gas to be monitored. The reflection means is arranged to direct the IR beam back to the photoelectric means which receives the reflected IR beam and provides an electrical output signal indicative of the amount of beam attenuation through the smoke or gas being monitored via electrical conductors 122 to the control components of the system 20. Thus, in accordance with one preferred embodiment of this invention, each of the infrared detectors 120 used is mounted so that its IR beam is directed transversely into the interior of the guide tube for reflection back to the photo-detector means thereof, so that upon the introduction of exhaust fumes therein, e.g., when the vehicle's engine is started or when a running vehicle's exhaust stack enters the guide tube, the IR beam is attenuated by the smokey fumes within the guide tube. The attenuated IR signal is received by the photo-detecting means to provide an output signal on conductors 122 to control the operation of the system 20, e.g., turn the fan 50 on.

Without further elaboration the foregoing will so fully illustrate our invention that others may, by applying current or future knowledge, adapt the same for use under various conditions of service.

We claim:

1. An exhaust fumes distribution system for use within a structure adjacent to a space in which a vehicle having an engine coupled to a vertically oriented, open ended, exhaust stack is to be located to automatically attach/detach to the open end of said stack to discharge exhaust fumes from said vehicle out of said structure, said exhaust fumes distribution system comprising:

(a) an elongated guide tube having a hollow interior and a slot having first and second spaced apart marginal edges which extend longitudinally along said guide tube and in communication with said hollow interior thereof, said guide tube being arranged to be mounted horizontally above the space so that said slot extends from a first position adjacent an entrance to the structure to a second position within the structure remote from the entrance, said guide tube having an inner surface and an outer surface and a first open end;

(b) first and second resilient sealing members, each of said sealing members being an elongated member of generally C-shape cross section and having a pair of edges, one of said edges of said first sealing member being secured to the inner surface of said guide tube remote from said first marginal edge and the other of said edges of said first sealing member being secured to said guide tube immediately adjacent said first marginal edge, one of said edges of said second sealing member being secured to the inner surface of said guide tube remote from said second marginal edge and the other of said edges of said second sealing member being secured to said guide tube immediately adjacent said second marginal edge, whereupon peripheral portions of said first and second sealing members abut each other along substantially the length of said slot to form a sealed interface precluding exhaust fumes from flowing therethrough, said interface being arranged to open at any point along the length thereof for receipt of the open end of the exhaust stack of the vehicle, with the remaining portions of said interface remaining sealed;

(c) venting means coupled to the interior of said guide tube for venting fumes to the exterior of the structure, whereupon exhaust fumes from the open end of the stack are caused to flow down the interior of the guide tube for removal therefrom, with little or no exhaust gaining ingress to the ambient atmosphere within the structure through said interface even when the vehicle is moved in the structure from the first position to the second position and (d) gate means located within said guide means at said first open end and adapted to be opened by said exhaust stack to enabling said exhaust stack to pass there through into said guide means, whereupon said gate means automatically closes.

2. The exhaust fumes distribution system of claim 1 wherein said other of said marginal edges of said first sealing member is secured to said inner surface of said guide tube contiguous with said first marginal edge, and wherein said other of said marginal edges of said second sealing member is secured to said inner surface of said guide tube contiguous with said second marginal edge.

3. The exhaust fumes distribution system of claim 1 wherein portions of said sealing members adjacent said first open end of said guide member are arranged to form an open entranceway for receipt of said exhaust stack to facilitate the introduction of said exhaust stack into said interface.

4. The exhaust fumes distribution system of claim 3 wherein each of said sealing members is formed of rubber.

5. The exhaust fumes distribution system of claim 3 additionally comprising guide means for facilitating the introduction of the exhaust stack into said interface adjacent said first open end of said guide tube.

6. The exhaust fumes distribution system of claim 1 wherein said gate means is located within said guide means at said first open end and beyond said open entranceway.

7. The exhaust fumes distribution system of claim 1 additionally comprising switch means to control the operation of said venting means.

8. The exhaust fumes distribution system of claim 7 wherein said switch means comprises an IR photo-detector.

9. The exhaust fumes distribution system of claim 1 additionally comprising mounting means for mounting said guide tube within said structure so that said guide tube extends along a longitudinally extending line in said structure, and wherein said mounting means enables said guide tube to shift laterally of said line.

10. The exhaust fumes distribution system of claim 1 wherein said guide tube includes a second open end, and whereupon portions of said sealing members adjacent said second open end of said guide member are arranged to form an open entranceway for receipt of said exhaust stack to facilitate the introduction of said exhaust stack into said interface.

11. The exhaust fumes distribution system of claim 10 wherein each of said sealing members is formed of rubber.

12. The exhaust fumes distribution system of claim 10 additionally comprising guide means for facilitating the introduction of the exhaust stack into said interface adjacent said second open end of said guide tube.

13. The exhaust fumes distribution system of claim 10 wherein said gate means is located within said guide means at said second open end and beyond said open entranceway.

14. The exhaust fumes distribution system of claim 13 additionally comprising switch means to control the operation of said venting means.

15. The exhaust fumes distribution system of claim 14 wherein said switch means comprises an IR photo-detector.

* * * * *